May 31, 1938.    H. W. ALDEN    2,118,961
ENDLESS TRACK FOR HALF-TRACK TRACTORS
Filed March 20, 1934
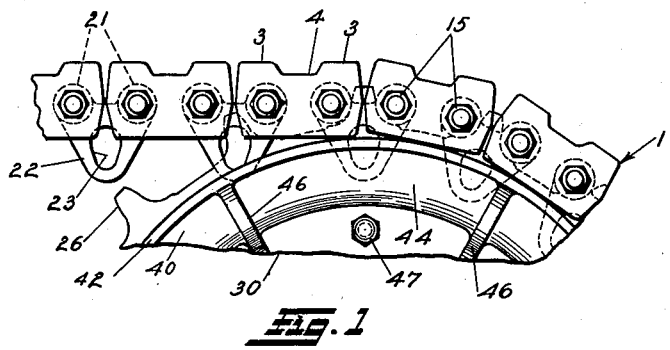
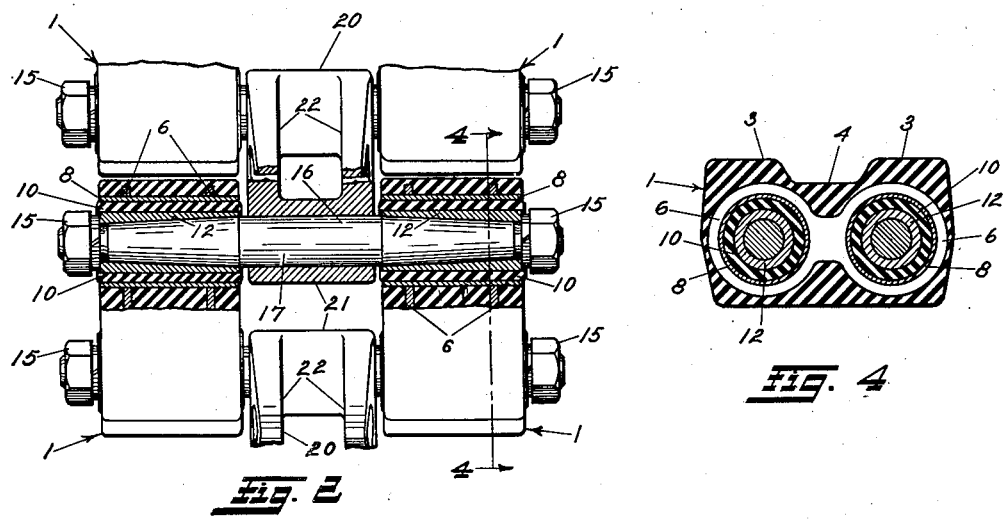
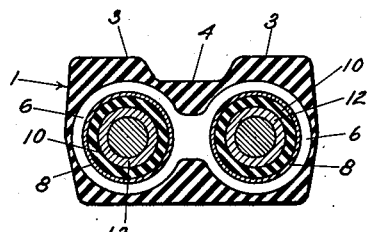
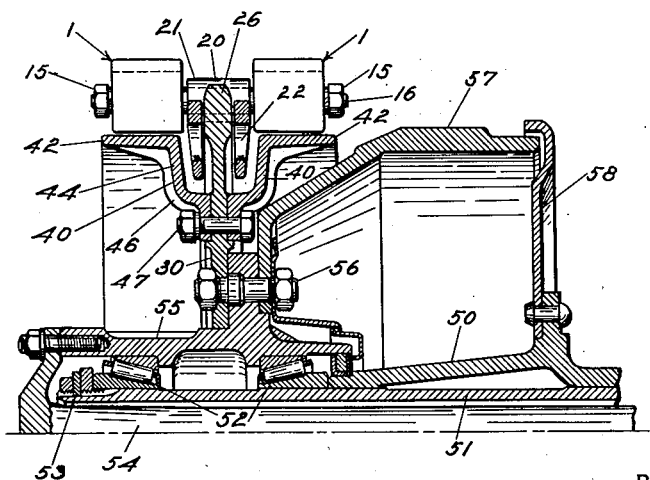
INVENTOR
*Herbert W. Alden*
BY
*Strauch + Hoffman*
ATTORNEYS Patented May 31, 1938

2,118,961

UNITED STATES PATENT OFFICE

2,118,961

ENDLESS TRACK FOR HALF-TRACK TRACTORS

Herbert W. Alden, Detroit, Mich., assignor to The Timken-Detroit Axle Company, Detroit, Mich., a corporation of Ohio Application March 20, 1934, Serial No. 716,547

9 Claims. (Cl. 305—10)

This invention relates to endless tracks in general and more particularly to endless tracks adapted for use on half-track tractors. For the purpose of this invention, what are conventionally known as six-wheel vehicles, that is, trucks having a conventional single axle at the front and dual axles at the rear, having four road wheels, the latter having endless tracks associated therewith, will be termed half-track tractors.

Half-track tractors have become quite popular due to their increased flexibility over the full track tractors. Some users of half-track tractors find it desirable to have interchangeability on their rear wheels; that is, where road conditions are good, conventional wheels and tires are used and where road conditions are bad, an endless track is used. For such usage, and even where the track constitutes the permanent traction mechanism, it is not necessary or desirable to have the wide, heavy and cumbersome endless track of the full track tractor. A track of extreme lightness, yet having sufficient strength, is desired. It is further desirable—and even more so in the conversion jobs—that the track be so constructed that it may be easily disconnected for removal from the vehicle.

The endless tracks that have been heretofore proposed have been unsuitable for operation in half-track tractors or other installations where fairly high speed, quietness of operation and flexibility are prime considerations, because their relatively massive construction makes it impracticable to operate them at high speed and their inherent design renders them noisy in operation, even at fairly low speeds. In such prior mechanisms, the track or tread members are constructed of metal, with the result that when they pass over the driving sprockets and load supporting rollers they set up an excessive noise. Moreover, when such track constructions are operated on paved roads or streets, the metallic treads are extremely noisy in operation.

I am aware that endless tracks having rubber treads have been heretofore proposed, but such track constructions have never gone into commercial use for the reason that the rubber treads stretch, and distort to such a degree when placed under load, that the links do not properly ride upon the sprockets. Such prior constructions were also defective because the rubber treads would not only get out of proper alignment but would often tear loose from the links after they had been in use for only a short period of time. Another disadvantage inherent in such prior track constructions resides in the fact that although tension members were incorporated in their rubber treads for taking the pull exerted by the sprockets, the rubber was merely loosely molded about the reenforcing means, with the result that the twisting action of the track when in operation would cause the reenforcing means, and sometimes the link, pins or bushings, to pull free from the rubber, and thereby render the track useless. Such prior constructions in addition to possessing the disadvantages just discussed, are also extremely costly to manufacture.

It is accordingly a principal object of my invention to devise an endless track which is light and flexible, but which is nevertheless durable and which may be cheaply manufactured.

It is another major object of my invention to devise a novel endless track which is simple in design, involves no slidably moving parts, and is almost silent in operation.

It is another important object of my invention to provide an endles track of the character having a plurality of non-metallic tread members, each of which has a face constituting a bearing surface, and a load supporting surface, with means for efficiently reenforcing it against harmful stretching in operation.

Another object is to devise a novel endless track which may be disconnected, for removal from the vehicle on which it is installed, with a minimum of difficulty.

Another object of my invention is to so design the parts of an endless track that they may be readily assembled and disassembled.

It is a further object of this invention to provide an endless track, whose tread portions are constructed of rubber, with a driving connection molded therein that efficiently maintains proper alignment of the track at all times.

It is a still further object of this invention to devise a novel sprocket and pulley assembly for an endless track construction.

Another object is to devise a novel sprocket and pulley organization for an endless track construction, which may be readily disassembled to permit removal of the track, and/or the substitution of load-supporting wheels therefor.

Further objects of my invention will appear as the detailed description thereof proceeds in connection with the annexed drawing and from the appended claims.

In the drawing:

Figure 1 is an elevational view of a portion of the track of the present invention, in position on a driving sprocket.

Figure 2 is a plan view, in partial section of the track shown in Figure 1, looking upwardly in that figure.

Figure 3 is a sectional view through the outer end of a driving axle showing the invention applied thereto, and, Figure 4 is a sectional view of one of the tread members and is taken along the line 4—4 of Figure 2.

Referring now to the drawing wherein like reference numerals refer to like parts wherever they may occur, and with particular reference to Figure 2, the numeral 1 represents an outer member or tread which is preferably made of molded rubber, but which can be made of any suitable resilient or fibrous material, and it is essentially rectangular in section, having at its upper surface two lateral pads or feet 3 with a depression 4 therebetween.

Molded or cast within member 1 are two spaced members 6, which are constructed of rather thin metal and have a pair of apertures formed therein. Extending through the apertures in members 6, are a pair of cylindrical sleeves 8. Members 6 are preferably welded or otherwise secured in spaced relationship on cylinders or sleeves 8 and this is preferably effected before they are molded or cast within member 1. A sleeve of rubber or other resilient material 10 is disposed within sleeve 8, and a second metallic sleeve 12, which is tapered throughout its length on its inside diameter, is disposed within rubber sleeve 10.

Rubber sleeve or bushing 10 may be secured to sleeves 8 and 12 in any desired manner, as by frictional bond, set up by the rubber being placed under mass tension, or, if desired the parts may be adhesively secured by vulcanization or the like, and in any event the rubber is adapted to undergo a shearing action when sleeves 8 and 12 are rocked relatively to each other. The term "mass tension" is used to describe the condition of the rubber when bushing 10 is so dimensioned that the parts fit tightly and the rubber "flows" or is distorted when they are forced into place. Although I prefer to employ a rubber joint in my construction, sleeve 8 may be made thicker and be journalled directly upon sleeve 12 and a satisfactorily operating device obtained.

Each tread assembly consists of a pair of tread members, and they are disposed side by side as seen in Figure 2, and extending through the tapered portions of sleeves 12, and removably secured therein by nuts 15, are pins 16 which are symmetrical about their vertical center lines, that is, they have two such tapered portions, one at each end joined by straight portions 17 at their centers. Straight portions 17 of pins 16 are adapted to be press-fitted into apertures provided therefor in links 20. Links 20 consist essentially of two cylindrical portions 21—which have the before mentioned apertures therein—which are joined at their ends by triangular web portions 22, and which contain holes 23 for the purpose of reducing their weight. The openings 24 defined by the two cylindrical portions 21 and the web portions 22 of links 20 form female driving notches for teeth 26 of a driving sprocket 30.

As has been indicated when sleeves 12 are drawn up on the tapered portion of pins 16 by tightening nuts 15, a frictional bond is established between the parts, and although nuts 15 may be turned home in any desired manner, I preferably assemble the parts and tighten nuts 15 when the treads are disposed flat and links 20 are symmetrically disposed with respect thereto, so that the rubber bushings will constantly tend to cause the track to assume a flat or straight configuration.

Referring now to Figure 3, sprocket 30 is a substantially flat disk and has teeth 26 at its outer periphery, and suitable apertures for attaching it to a hub member, and suitable flat surfaces, annular pilot shoulders and bolt holes for attaching supporting wheels 40. A pair of supporting wheels 40 are associated with sprocket 30 and are of identical construction, and each has a cylindrical portion 42 whose outside diameter is equal to, or just slightly less than the diameter formed by the inner surfaces of treads when the latter are in position on the wheels. Cylindrical portions 42 are supported by walls 44, leading therefrom to flanges which register with the surfaces provided therefor on sprocket 30. Wheels 40 are reinforced by means of a series of ribs 46, which extend radially between the attaching bolts 47 from the outermost portion of the cylindrical surfaces 42 to the inner edge of the wheels. Cylindrical or drum portions 42 of wheels 40 are adapted to ride directly upon the inner surfaces of treads 1 and thereby prevent any undue amount of bending of pins 16, and insulate the wheels from the metal parts of the track insofar as load supporting functions thereof are concerned.

With further reference to Figure 3, it will be noted that the outer end of a conventional driving axle, is illustrated, and it consists essentially of a housing nose 50 through which extends a sleeve 51. Bearings 52 are supported on sleeve 50 and they are suitably secured in place thereon by a locking assembly 53. A shaft 54 extends through sleeve 51, and to its flanged end is secured a hub member 55, which is in turn supported on bearings 52. A wheel stud 56 is inserted through the driving flange of hub 55 and by means of nuts, removably secures a brake drum 57 on one side thereof, and sprocket 30 on the other. Any conventional type of brake mechanism (not shown) may be used and mounted on a backing plate 58, which is shown as being riveted to housing nose 50.

The assembly of the above-described endless track is very simple. Pins 16 are first preferably press-fitted into links 20 to the desired position, then treads 1, which as before mentioned, are made as a unit, are merely assembled upon the tapered portions of two adjacent pins of links which have been placed end to end. Nuts 15 are then threaded into place and tightened so that the respective treads are drawn firmly in place upon the tapered portions of pins 16.

If desirable, the sprockets and endless track may be assembled as a unit and then bolted to the driving members, or the sprockets may first be assembled and the endless track put on last merely by means of assembling two tread members 1 on the opposite ends of two adjacent pins 16.

From the foregoing description, it will be apparent that the cost involved in the manufacture of the component parts of my novel track is low and that an efficient and durable structure is produced. The facility with which assembly is accomplished will also be apparent. Its adaptability to a conventional truck having a multi-wheel unit makes the device very desirable when working in marsh lands or other lands of poor traction conditions.

The operation of my device is as follows. When the vehicle is stationary or moving, the load is supported solely by treads 1, as they are interposed between the ground or other bearing surface and the drum portion 42 of wheels 40, and also any ancillary, load-supporting rollers. In this connection, it is to be observed that the inwardly extending portions of links 20 serve as guiding elements to prevent lateral displacement from wheels 40 or from any ancillary load-supporting rollers that may be used in the tractor construction. The load supporting rollers are disposed between the wheels and ride upon the track, and in a half-track tractor they only take a portion of the load, whereas in a full tractor they usually take all of the load.

When rotative efforts are applied to shaft 54, they are transmitted through hub 55 to sprocket 30 and teeth 26 of the latter transmits driving forces to links 20. The pull imparted to links 20 by teeth 26 is transmitted to treads 1 through pins 16 and rubber bushings 10. The tractive forces are transmitted through treads 1 by way of members 6, and as the latter are only subjected to tensional forces, they may accordingly be thin. In view of the fact that the engagement of treads 1 with wheels 40 presents a comparatively high coefficient of friction, a substantial portion of the tractive effort is transmitted between the two in this manner.

It should be observed that as pins 16 are press-fitted into links 20, and as pins 16 are connected to treads 1 through resilient joints, no lubrication whatever is required for my track construction as no sliding movement is present in the parts.

Although I have illustrated my track construction as being applied to a half-track tractor, it is to be understood that it may be used in any other type of tractor without departing from the spirit of my invention.

Although I prefer to secure members to sleeves 8, it is to be understood that they may be merely loosely or frictionally fitted upon bushings 8, and the rubber of treads 1 relied upon to maintain them in proper assembled position if desired without departing from the spirit of my invention.

It is observed that links 20 constitute the sole means of securing the tread units together, and while I prefer to use this construction, as it renders the track flexible and free from tendencies to clog up with soil, it is to be understood that if desired, link members may be employed to connect the outer ends of pins 16 without sacrificing the advantages of my resilient tread construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an endless track construction in sub-combination, a tread element adapted to form a part of an articulated track, comprising a pair of parallelly disposed, longitudinally spaced sleeve members; means for connecting said sleeve members together in spaced relationship and operable to prevent them from moving away from each other; and a body of resilient material surrounding the outer cylindrical surfaces of said sleeve members and completely enveloping said means.

2. The track construction described in claim 1, wherein said means is also operable to restrain movement of said members toward each other.

3. The track construction described in claim 1, wherein said means is operable to restrain said sleeve members against relative rotational movements about their axes.

4. The track construction described in claim 1, wherein said means comprises at least one tensional element disposed between said sleeve members and disposed in engagement with at least a portion of their outer cylindrical surfaces.

5. The track construction described in claim 1, together with a second pair of sleeve members disposed within said first-named sleeve members and spaced therefrom by a body of rubber and frictionally secured thereto.

6. In an endless track construction, in sub-combination, a resilient tread element, comprising a pair of parallelly disposed, longitudinally spaced sleeve members; a relatively thin metallic element disposed normal to the axes of said sleeve members and having a pair of apertures provided therein, said sleeve members extending through said apertures and having their outer surfaces disposed in engagement with the walls of said apertures; and a body of resilient material surrounding the outer cylindrical surfaces of said sleeve members and completely enveloping said metallic element.

7. The track construction described in claim 6, wherein said metallic element is secured to said sleeve members to thereby prevent relative rotation thereof.

8. The track construction described in claim 6, together with a second pair of sleeve members disposed within said first-named sleeve members and having the outer walls thereof spaced from the latter by a body of rubber disposed between them and frictionally secured thereto.

9. In an endless track construction, in sub-combination, a tread member having a pair of parallel spaced openings therein; a bushing disposed in each opening, a rubber sleeve disposed in each bushing; a metallic sleeve, having a tapered inner surface, disposed in each rubber sleeve, and at least one tension member embedded in said tread member and connected at its ends to said bushings, for preventing relative translational movement of the latter.

HERBERT W. ALDEN.